Oct. 15, 1940.  E. A. CORBIN, JR  2,217,834
VALVE CONSTRUCTION
Filed April 13, 1938  6 Sheets-Sheet 2
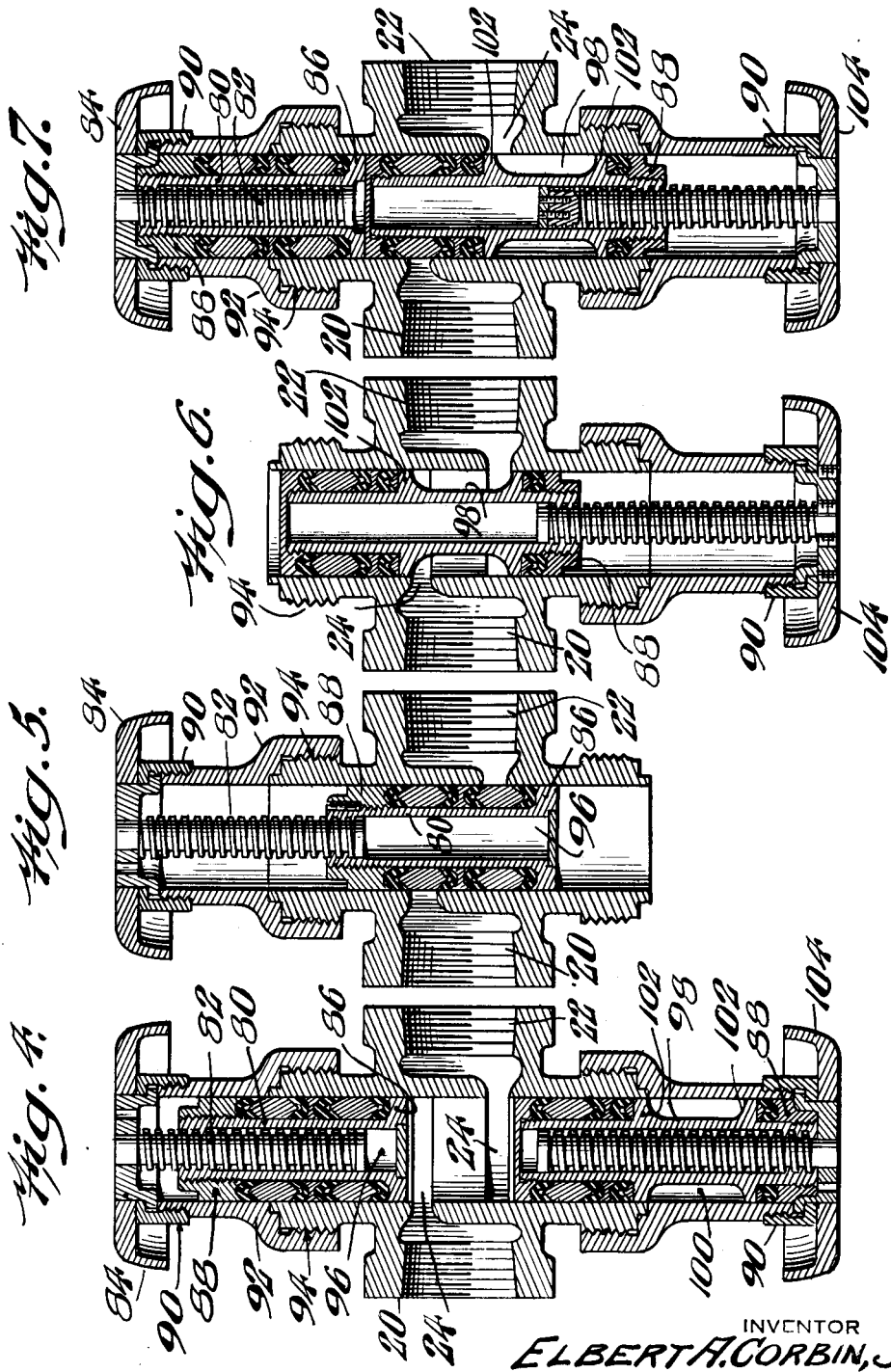
INVENTOR
ELBERT A. CORBIN, JR.
BY
Louis Necho
ATTORNEY

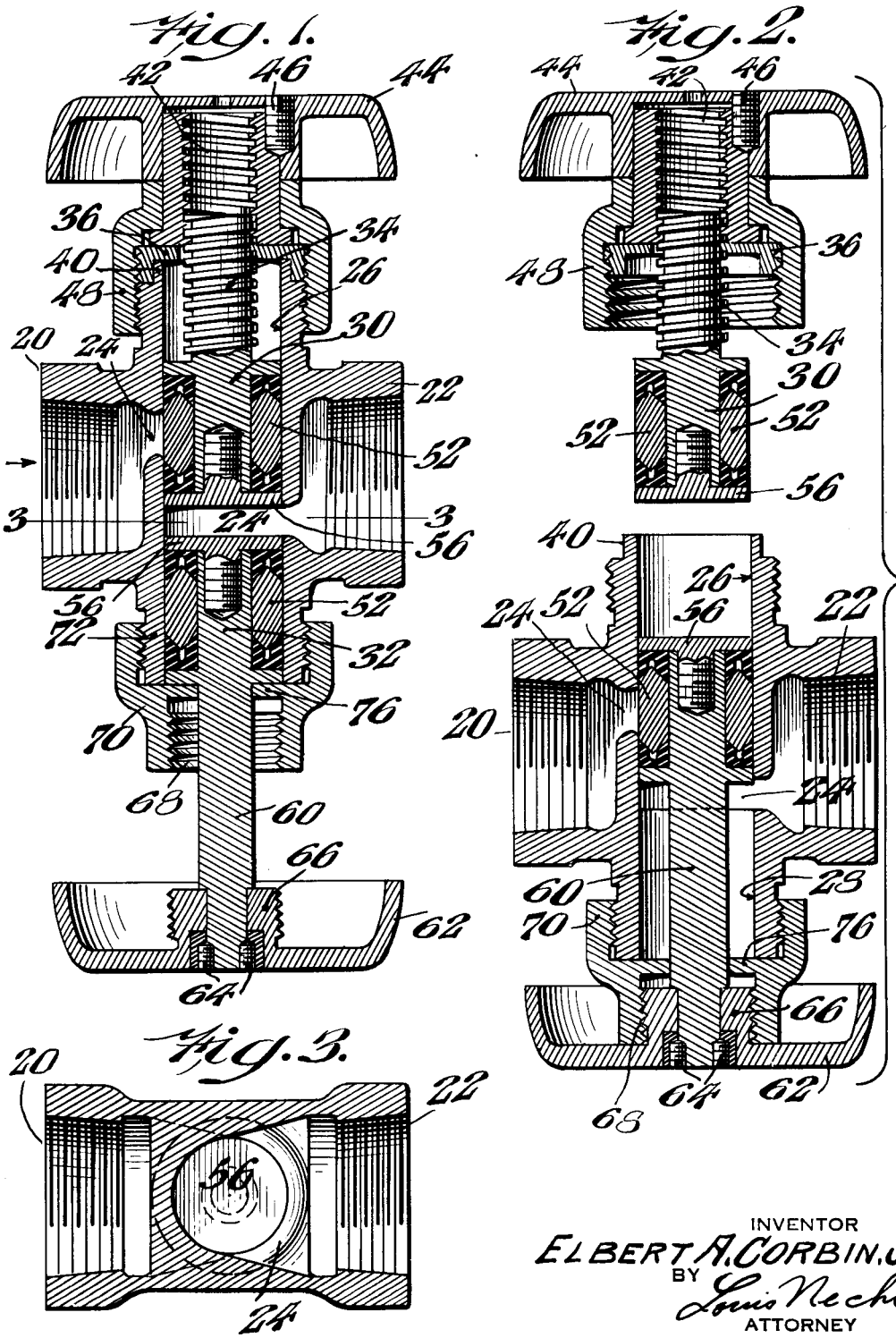

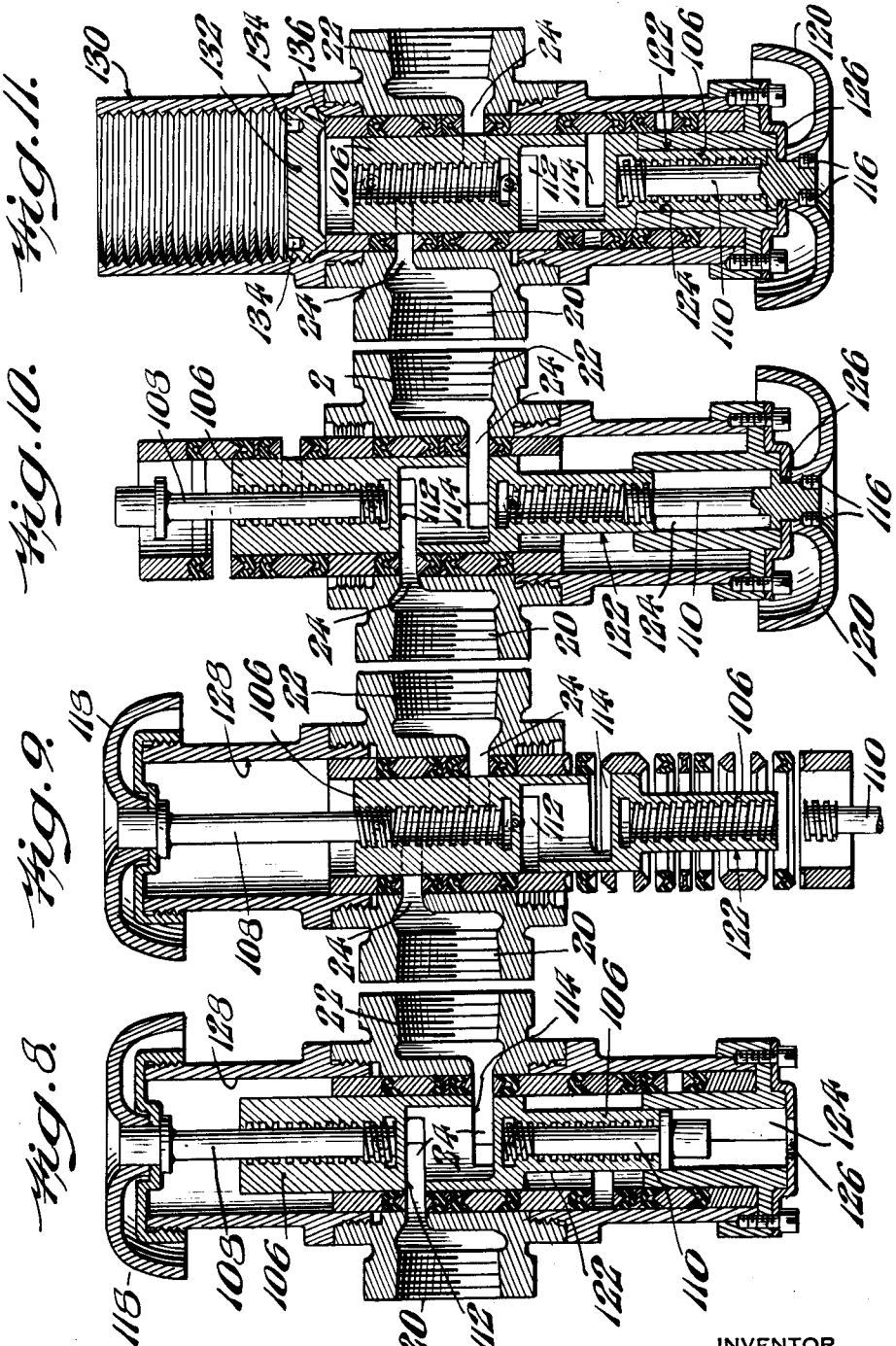

Oct. 15, 1940.   E. A. CORBIN, JR   2,217,834
VALVE CONSTRUCTION
Filed April 13, 1938   6 Sheets-Sheet 4
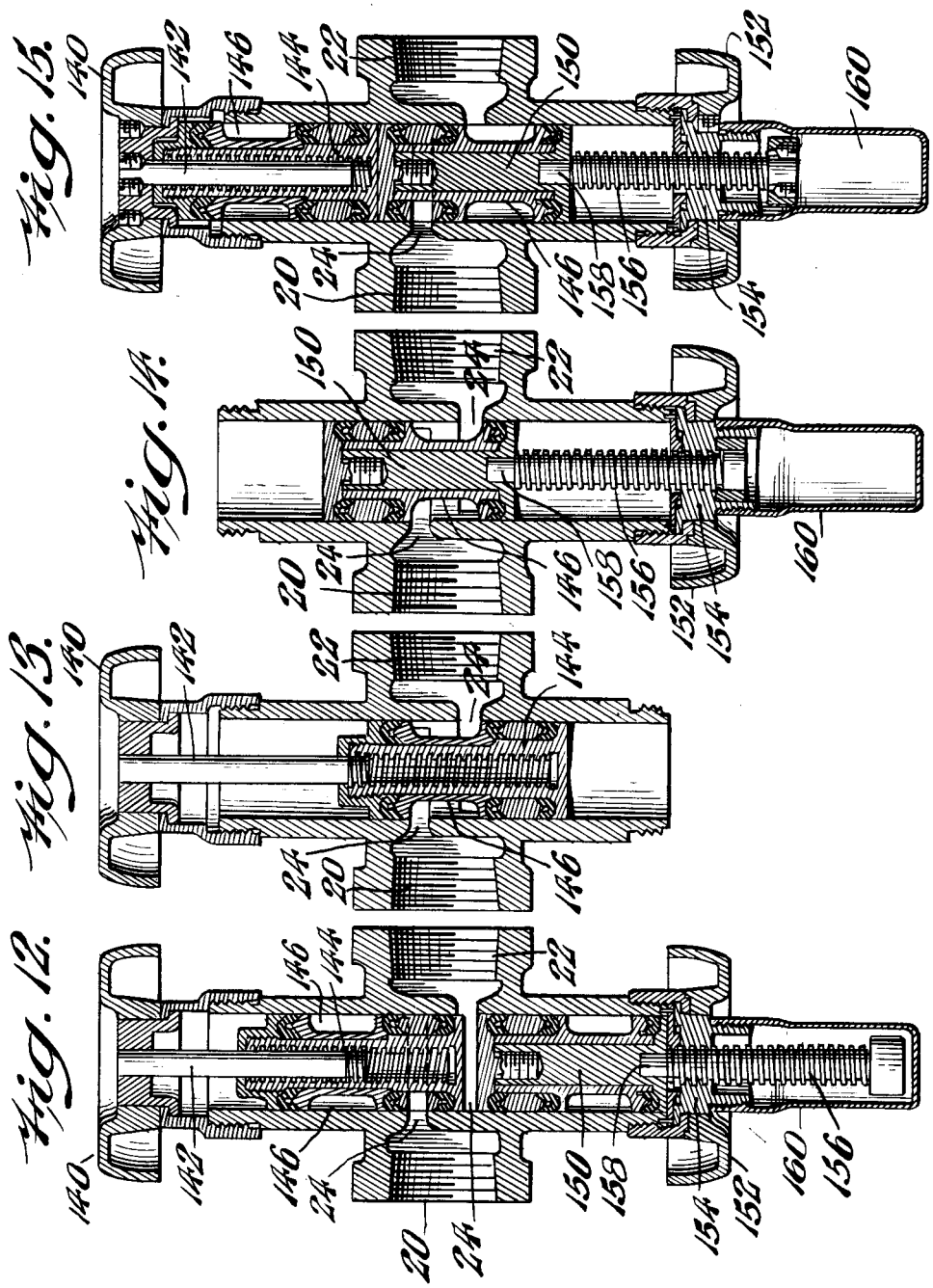
INVENTOR
ELBERT A. CORBIN, JR.
BY
ATTORNEY Oct. 15, 1940.  E. A. CORBIN, JR  2,217,834
VALVE CONSTRUCTION
Filed April 13, 1938  6 Sheets-Sheet 5

INVENTOR
ELBERT A. CORBIN, JR.
BY
ATTORNEY

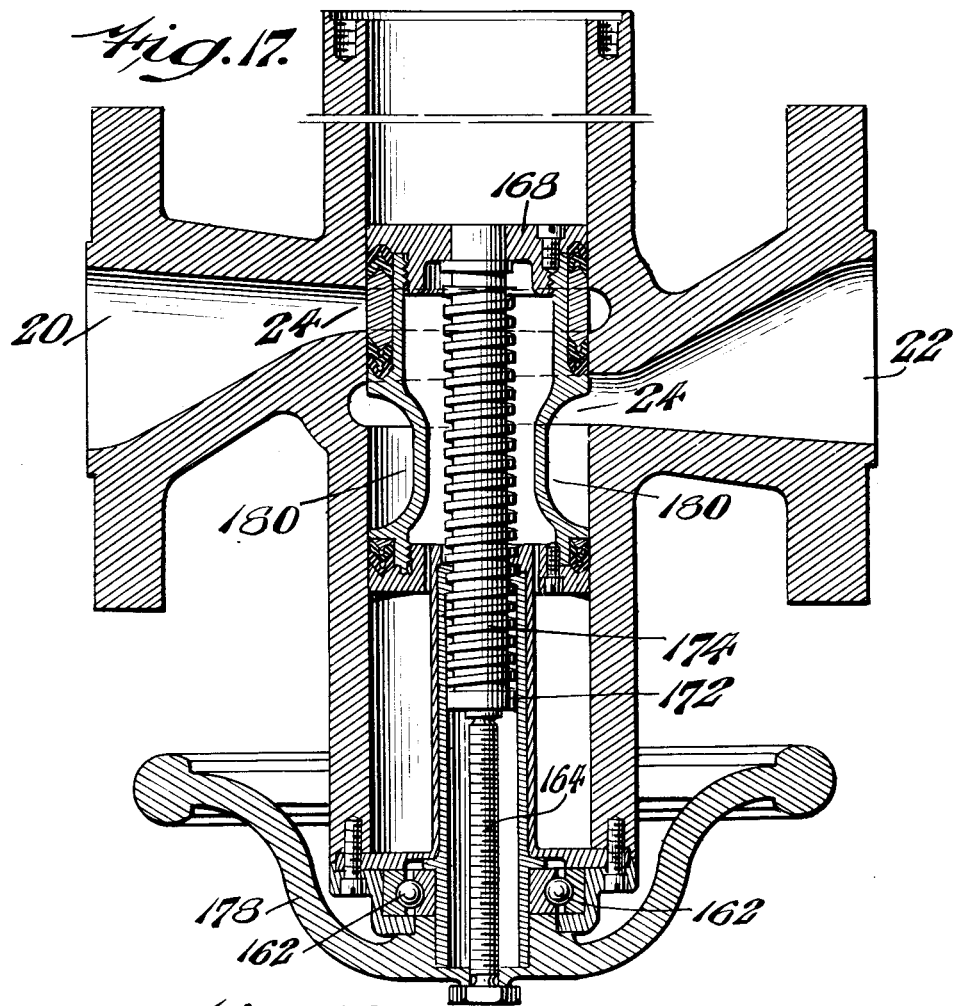
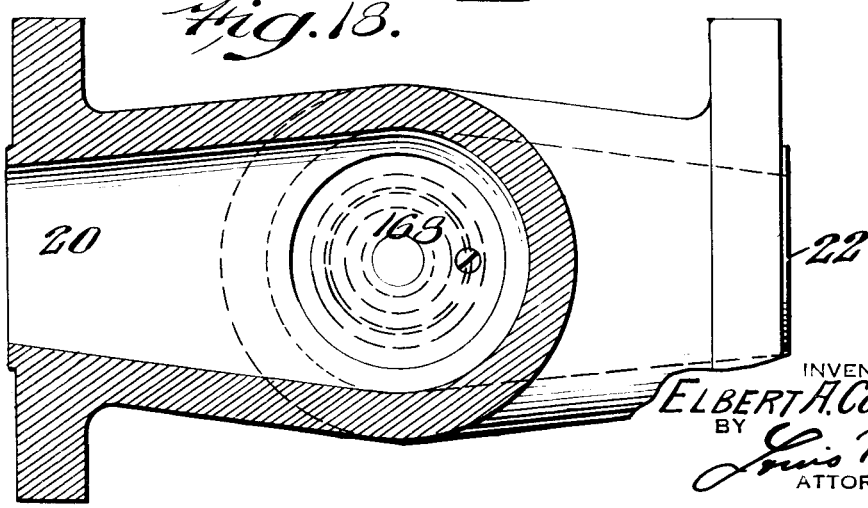

Patented Oct. 15, 1940

2,217,834

UNITED STATES PATENT OFFICE 2,217,834

VALVE CONSTRUCTION

Elbert A. Corbin, Jr., Lansdowne, Pa., assignor of one-half to William C. Biddle, Lansdowne, Pa.

Application April 13, 1938, Serial No. 201,695

3 Claims. (Cl. 277—2)

My invention relates to a new and useful valve construction and it relates more particularly to a valve construction including oppositely disposed reciprocating valve pistons operating within a common valve chamber or casing whereby either of said valve pistons may be used to perform all the intended functions of a conventional valve while the other of said valve pistons is removed for inspection or repair without interrupting the service.

My invention still further relates to a valve construction in which no stuffing box for the valve stem is needed and in which gaskets or other packing may be incorporated in and carried by the body of either the valve pistons or in the walls of the valve chambers in which said valve pistons reciprocate.

My invention still further relates to a valve construction in which the assembly of the valve piston is such that the mere unthreading of a single connection is sufficient to expose the valve piston and its packing for servicing and in which the unthreading of a second attachment is sufficient to dismantle the entire assembly of such valve piston.

My invention still further relates to a valve construction in which a pair of oppositely disposed V-packings are at all times disposed on either side of the passage controlled at any given time by either of said valve pistons.

In connection with boilers or other pipe lines such as oil pipe lines and the like, and in fact in all other circumstances in which a valve is used, it has been necessary heretofore either to provide a plurality of valves and by-passes for the same if the service is to be maintained, or to dump the contents of the boiler or the line while other, relatively remotely disposed valves are shut off for the repair or replacement of a damaged or leaking valve at any given point. In the case of a boiler, for instance, it is necessary to empty the boiler, pull the fire, and altogether interrupt the service pending repairs, and, if, for the purpose of illustration, the same conditions are applied to a long distance oil pipe line, it is necessary either to have a complicated and expensive set of valves and by-passes, or the next valve, which is not damaged and which may be quite a distance away from the valve which needs repair, has to be closed and the contents of the line, between said next valve and the damaged valves which may amount to thousands of gallons of oil have to be wasted and the service interrupted pending repairs. While I have used a boiler and a remote control oil pipe for the purpose of illustration, it is of course obvious that the same condition prevails in connection with other kinds of service or industry.

It is therefore the object of my invention to remedy this condition and provide a single valve construction which embodies two oppositely disposed valve elements, each of which is capable of controlling the passage involved either to shut the same or to continue the service uninterrupted while the other of said valves is completely removed for repair.

Other novel features of construction and advantage will be more clearly explained in the following specification and the accompanying drawings in which:

Fig. 1 represents a vertical section of one form of valve construction embodying my invention showing one valve piston on duty and the other valve piston held in reserve for emergency use.

Fig. 2 is a view similar to Fig. 1 showing the first-mentioned valve removed and the second-mentioned or reserve valve in use.

Fig. 3 represents a section on line 3—3 of Fig. 1.

Fig. 4 represents a view similar to Fig. 1 showing a modified form of construction.

Fig. 5 represents a view of the construction shown in Fig. 4 with the emergency valve removed.

Fig. 6 represents a view similar to Fig. 4 with the operating valve removed and the emergency valve shown in blowing position.

Fig. 7 represents a view similar to Fig. 4 showing the emergency valve brought into position to shut the passage to permit removal of the operating valve.

Fig. 8 represents a vertical sectional view showing a modified form of construction with the operating handle of the emergency valve removed.

Fig. 9 represents a view similar to Fig. 8 with the casing of the emergency valve removed and with the corresponding piston exposed to afford access to the packing.

Fig. 10 represents a view similar to Fig. 9 with the conditions reversed.

Fig. 11 represents a vertical cross-section showing the application of a removing tool which is used for shifting the packing surrounding the valve piston in either direction for servicing.

Fig. 12 represents a vertical cross-section through another modified form of my invention.

Fig. 13 represents a view similar to Fig. 12 with the emergency valve piston removed.

Fig. 14 represents a view similar to Fig. 12 with the operating valve piston removed, and with the emergency valve piston in use.

Fig. 15 represents a view similar to Fig. 12 showing the emergency valve piston moved into its operative position and the operating valve ready to be removed.

Fig. 17 represents a vertical section of the same structure shown in Fig. 16 with the operating valve removed.

Fig. 18 represents a section on line 18—18 of Fig. 17.

Figure 16:
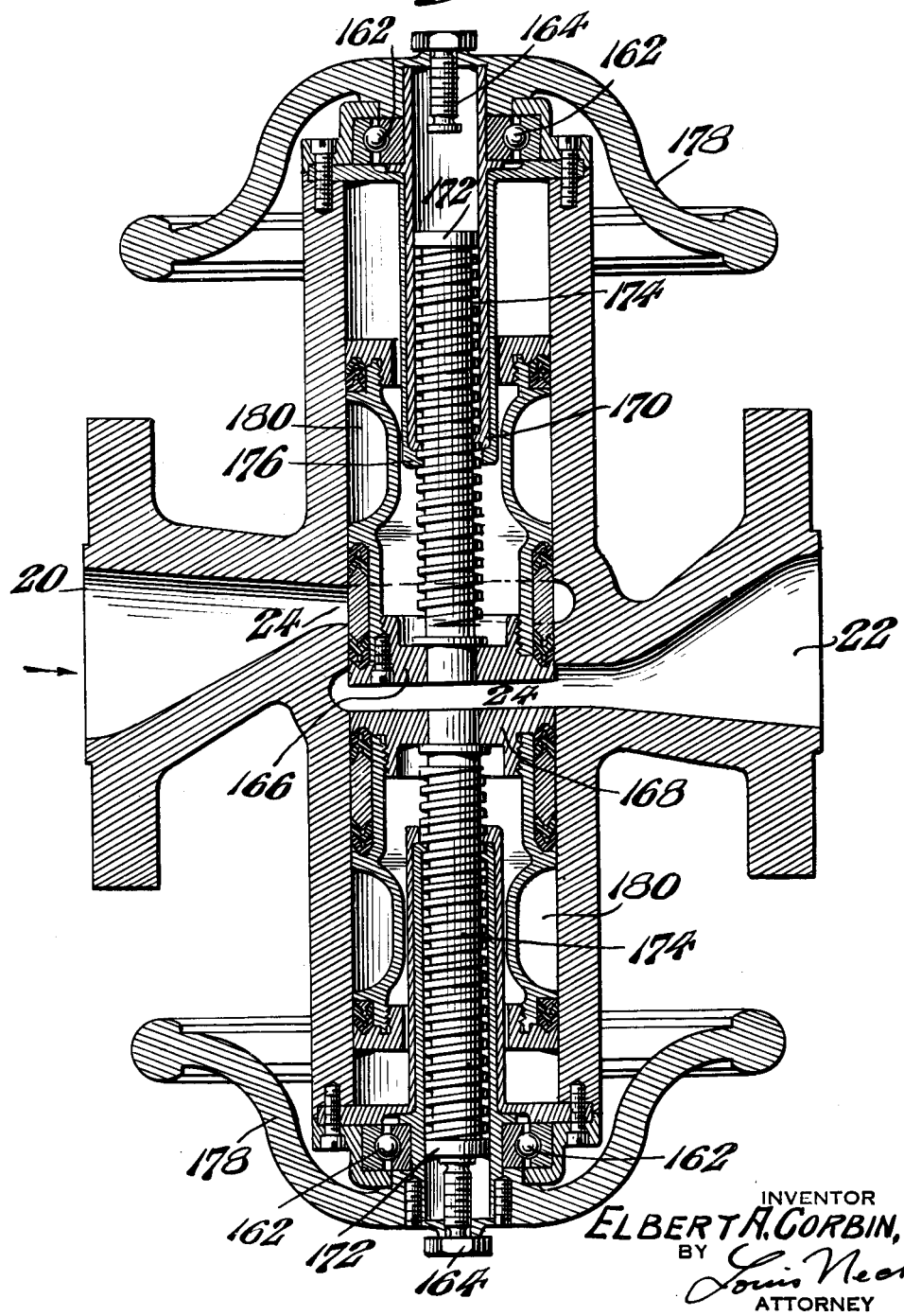
Fig. 16 represents a vertical cross-section showing a still further modified form of my invention.

Referring to the drawings in which like reference characters indicate like parts, and more particularly to Figs. 1, 2 and 3, the numerals 20 and 22, respectively, designate the inlet and outlet of the valve to be controlled by my novel construction. The inlet 20 leads to the outlet 22 through the passage 24 which extends across and communicates with the cylindrical chambers 26 and 28 in which reciprocate the valve pistons 30 and 32. The valve piston 30 is carried by the threaded stem 34 which is engaged against rotation by the toothed washer 36 which abuts against the edge of the extension 40 of the valve casing. 42 designates an internally threaded sleeve or bushing for engaging the threaded stem 34, the sleeve or bushing 42 being keyed to the operating handle 44 by the set screw 46. 48 designates a bonnet which clamps the bushing 42 and threadedly engages the toothed washer 36 and the casing extension 40 to enclose and fasten the entire assembly. The valve piston 30 is provided with the ring 52, on the opposite ends of which are disposed V-shaped packings which are retained by the head 56 which threadedly engages the valve piston 30 for adjustably compressing the gaskets against an overhanging flange at the top of the piston 30 as viewed in Fig. 1. The valve piston 30 is, for the purpose of this specification, designated as the operating valve, that is, the one to be used under normal conditions and as long as it functions effectively. The valve piston 32, which is here designated as the emergency valve, is provided with the same retaining head 56, ring 52 and V-shaped packings as the piston 30, but is provided with the unthreaded stem 60 which is secured and keyed to the operating wheel 62 by the set screws 64. The handle wheel 62 is provided with the externally threaded hub 66 which is adapted to engage the threads 68 in the bonnet 70 which in turn threadedly engages the casing extension 72. In actual and normal operation the valve will assume the position shown in Fig. 1 in which the piston 30 serves to shut off the passage 24 or, if it is desired to open the passage 24 the handle wheel 44 is turned to move the piston 30 and its packing above the passage 24 as viewed in Fig. 1. When pressure is admitted from the inlet 20 into the passage 24 on its way to the outlet 22, the piston valve 32 is pushed down automatically until it abuts against the flange or shoulder 76 of the bonnet 70. If it is desired to remove the operating valve as shown in Fig. 2 it is merely necessary to turn the handle wheel 44 in the proper direction and simultaneously to push the handle wheel 62 upwardly to follow the receding piston 30 until the upper portion of the piston 32 has closed the opening 24, whereupon, the threaded hub 66 is screwed into the threaded portion 68 of the bonnet 70. This brings the piston 32 into the closing position shown in Fig. 2 and locks it in position against pressure.

In Figs. 4 to 7 I have shown a modified form of valve in which the hollow operating piston 80 threadedly engages the stem 82 which, except for being rotatable with the hand wheel 84 is stationary as far as reciprocatory movement is concerned. The piston 80 is provided with the same type of V-shaped packing disclosed in Fig. 1, it being noted that the packing is adjustably compressed against the bottom shoulder 86 by the threaded bushing 88. The hand wheel 84 rotates around the retaining nut 90 which engages the bonnet 92 which in turn engages the valve casing at 94. The piston 80 is only threaded at its upper end for engagement with the stem 82 and the balance of its interior 96 is a smooth bore as best seen in Fig. 5. In this construction the operating valve piston 80, when in the position shown in Fig. 5 simply serves to close the opening 24. If the operating valve 80 should be damaged, the emergency valve piston 98 may be used either for blowing, as shown in Fig. 6, or for merely stopping or shutting off, as shown in Fig. 7. The emergency valve piston 98 is substantially identical in its structure and packing, etc., with the valve piston 80 except that it is provided with the annular recess 100 which, when brought into registration with the inlet 24 as shown in Fig. 6, establishes communication between the inlet 20 and the outlet 22. It will be noted that this valve construction is universal in its function in that, when the emergency valve 98 is in the position shown in Fig. 6 it permits the passage of pressure in either direction so that the outlet 22 may become the inlet and the inlet 20 may become the outlet 22. In actual operation if it is desired to blow or to permit passage of the pressure or liquid through the opening 24, the valve is in the position shown in Fig. 4. If it is desired to stop the opening 24, the operating valve piston 80 is brought into the position shown in Fig. 5, and, if in this position the operating valve piston 80 should develop a leak so that it becomes necessary to use the emergency, then, if it is only desired to stop the passage 24, the valve piston 98 is brought into the position shown in Fig. 7 in which it is possible to remove the operating valve 80 in its entirety, and, if it is desired to blow or retain the passage 24 open, then, with the valve 80 entirely removed, the valve piston 98 is moved into the position shown in Fig. 6 so that it may act as a blow valve without any assistance from the valve piston 80. Due to the provision of the recess 100, the piston 98 is provided with the shoulder 102 which supports the necessary packings. The emergency valve piston 98 is manipulated by the hand wheel 104 which is the same in structure and operation as the hand wheel.

In Figs. 8 to 11 I have shown a modified form of construction in which I have a single or integral double-sided piston element 106 which threadedly engages at its opposite ends the spindles 108 and 110. In this construction any suitable arrangement of V-shaped packing is employed except that the packing is not part of, nor carried by the piston 106 but is disposed in a stationary manner along the inner wall of the valve casing surrounding the piston 106. The valve piston 106 is provided with the oppositely disposed openings 112 and 114, one of which communicates with the inlet 20 and the other with the outlet 22, but it is to be noted that in this, as in the other forms of construction the outlet 22 may also serve as an inlet, while the inlet 20 may serve as an outlet if the conditions are reversed. The spindles 108 and 110 are secured by the set screws 116 to the hand wheels 118 and 120. The emergency end of the valve piston 106 is square at 122 and moves in a square opening 124 which prevents the rotation about its axis of the entire piston 106 when either of the actuating handles 118 or 120 is turned. While I have shown the emergency end of the piston 106 square, and the opening 124 square, it is to be understood that they could be of a shape other than square or they may be round and suitably splined or keyed to prevent rotation. The packing used in this construction is retained stationary by any suitable means.

As shown in Fig. 8 the normal operating portion of the valve 106 is shown in blowing position in which the openings 112 and 114 register with the inlet and outlet 20 and 22. In Fig. 9 the operating handle has been actuated to depress the piston 106 to take the openings 112 and 114 out of registration with the inlet 20 and outlet 22. In this position the free end of the spindle 110 will project through the opening 126, it being understood that in this form of construction the emergency operating hand wheel 120 is not used and is not assembled on the valve except when the emergency end of the piston 106 is to be used as otherwise it would prevent the movement of the emergency end of the piston 106. If the packing surrounding the operating part of the piston 106 should be damaged and necessitate repair, the hand wheel 118 is rotated until the end of the spindle 116 projects through the opening 126, whereupon, the emergency operating hand wheel 120 is applied as shown in Fig. 10 and is then turned to bring the parts into the blowing position shown in Fig. 10 or in a shut-off position as shown in Fig. 11. If it is desired to renew the packing, the enclosing extension 128 is unthreaded and in lieu thereof I thread the temporary housing 130 into the same position as the extension 128 and within the extension 130 I thread the ejector nut 132 by means of a wrench engaging the holes 134 so that the effective surface of the ejector nut 132 bears upon the packing as at 136 to push it out of the casing normally enclosing it and render it accessible either as shown in Fig. 9 or Fig. 10. In this position the damaged packing can be replaced and then the valve can be reassembled for further normal operation. In this connection it is to be noted that the packing is arranged over a relatively long span so that a complete effective operating group at either end is always available for blowing or for shut-off operation at will. If the other end of the packing needs repair, the operation is reversed.

In Figs. 12 to 15 I have shown a further modification of my invention in which any valve casing, having the inlet and outlet 20 and 22, with the intermediate port 24, is used, and, in this construction, while, for the purpose of description, I have designated the inlet and outlet 20 and 22 respectively, it is to be understood that the same can be reversed. In this modification I utilize an operating hand wheel 140 which is suitably secured to a partly threaded stem 142 which engages the hollow internally threaded valve piston 144 so that, as the hand wheel 140 is rotated, the piston 144 is raised or lowered at will. The piston 144 is provided with suitable packing and also with the annular recess 146 which, when brought into registration with the opening 24 and the inlet and outlet 20 and 22, establishes communication therebetween, and which, when brought out of registration with said openings as shown in Fig. 12, permits the valve piston 144 to shut off all communication. 150 designates an emergency valve, which as far as the packing and the annular opening 146 are concerned, is substantially the same as the valve piston 144, and which may, as to the rest of the construction, be identical with the assembly of the piston 144, or may be constructed as shown in Fig. 12 in which the hand wheel 152 is keyed to the threaded hub 154 so that the two turn together and the threaded hub 154 engages the threaded stem 156 which is connected at 158 to the piston 150. 160 designates any suitable cap or enclosure which serves to enclose the threaded stem 156 to prevent dust and dirt from reaching the movable parts. In this construction, as long as the operating piston 144 is in good condition, the piston 150 remains as shown in Fig. 12. If it is necessary to repair the packing or other parts of the piston 144, the hand wheels 140 and 152 are operated substantially simultaneously so that the piston 150 is in constant following contact with the piston 144 while the latter is being withdrawn and the piston 150 either assumes the blowing position shown in Fig. 14 or the shut-off position shown in Fig. 15. When the piston 150 has assumed that position, the assembly of the piston 144 can be completely removed without interrupting the service.

In Figs. 16 to 18 I have shown another modified form of construction which embodies the same principle as that disclosed in Figs. 12 to 15 except that it is designed for extra heavy duty and either for threaded or flanged connection as to its inlet and outlet 20 and 22. Also, in this heavy duty construction I utilize the ball bearings 162 to facilitate manipulation under tremendous pressure and I provide the stop 164 at either end of the housing to limit the movement of the pistons 166 and 168 in one direction, and I utilize the stops 170 which from abutments for the heads 172 of the threaded stems 174 to limit the movement of the pistons in the opposite direction. 176 designates a key or a spline to prevent the turning of each of the pistons about its axis with the rotation of the hand wheels 178 which would of course, if permitted, prevent the reciprocatory movement of the pistons 166 and 168. In Fig. 16 I have shown the operating piston 166 in the shut-off position, but it is to be understood that by lowering the piston 166 down as viewed in Fig. 16 to bring the annular opening 180 into registration with the openings 20, 22 and 24 the valve will assume the blowing position. In Fig. 17 I have shown the operating piston 166 removed and I have shown the emergency piston 168 in use to shut off the port 24, and, if it is desired to use the emergency valve 168 for blowing while the operation piston 166 is still removed, it is merely necessary to operate the hand wheel 178 further to bring the annular recess 180 in the piston 168 to register with the openings 20, 22 and 24.

While I have shown a number of modified forms to illustrate some of the ways in which the mechanical details may be varied or how the principle of the invention may be modified to meet various conditions, it is to be understood that my invention principally resides in the provision of oppositely disposed valves either of which may be used to control a given passage independently of the other, thereby eliminating all interruption of service and attendant waste.

Having thus described my invention, what I claim as new and desire to secure by Letters Patent is:

1. A valve construction comprising a casing having an inlet and an outlet, there being ports leading from said inlet and said outlet into said casing at different horizontal levels, a pair of separate oppositely disposed and independently operable valve pistons adapted jointly or severally to control either or both of said ports, and separate means at the opposite ends of said valve casing for actuating each of said valve pistons.

2. A valve construction comprising a casing having an inlet and an outlet, there being ports leading from said inlet and said outlet into said casing at different horizontal levels, a pair of separate oppositely disposed and independently operable valve pistons adapted jointly or severally to control either or both of said ports, and separate means at the opposite ends of said valve casing for actuating each of said valve pistons, there being an annular recess formed in the body of at least one of said valve pistons for establishing communication between said ports while simultaneously closing the end of said casing opposite to said valve piston.

3. A valve construction comprising a casing having an inlet and an outlet, there being ports leading from said inlet and said outlet into said casing at different horizontal levels, a pair of separate oppositely disposed and independently operable valve pistons adapted jointly or severally to control either or both of said ports, and separate means at the opposite ends of said valve casing for actuating each of said valve pistons, there being an annular recess in the body of each of said valve pistons whereby each of said valve pistons may be used for closing said ports or for establishing communication between said ports while simultaneously closing the opposite end of said casing.

ELBERT A. CORBIN, Jr.